US005801951A

United States Patent [19]

Burns, II et al.

[11] Patent Number: 5,801,951

[45] Date of Patent: Sep. 1, 1998

[54] PRECISION 2-PART EPOXY DISPENSING APPARATUS AND METHOD

[75] Inventors: Arthur Edward Burns, II; Peter Michael Davis, both of Santa Cruz; Dean Albert Tarrant, Sand Jose, all of Calif.

[73] Assignee: Seagate Technology, Inc., Scotts Valley, Calif.

[21] Appl. No.: 820,714

[22] Filed: Mar. 18, 1997

[51] Int. Cl.[6] .......... G06F 19/00

[52] U.S. Cl. .......... 364/479.09; 222/52; 364/479.1

[58] Field of Search .......... 364/479.09, 479.1, 364/479.06, 571.01, 571.08; 702/85, 100, 105; 222/1, 52, 71; 141/2, 20, 18, 231, 94

[56] References Cited

U.S. PATENT DOCUMENTS

| | | | |
|---|---|---|---|
| 5,154,314 | 10/1992 | Van Wormer | 364/479.06 |
| 5,611,784 | 3/1997 | Barresi et al. | 604/211 |

*Primary Examiner*—Joseph Ruggiero

*Attorney, Agent, or Firm*—LaRiviere, Grubman & Payne

[57] ABSTRACT

A liquid dispense system for dispensing a 2-part epoxy resin compound to form bond beads having weights on the order of 1–20 mg. The dispensing system includes an epoxy resin compound pre-mixing and loading station, an epoxy dispense time and dispense force calibration station, and a plurality of epoxy dispensing third stations. Throughout the process, critical dispense related data is recorded on, and retrieved from, an on-board semiconductor memory device mounted on, and maintained with, the portable dispense syringe structure. Since the viscosity of the mixed epoxy compound is changing over time, any dispensing of constant amounts of the epoxy compound requires adjustments to dispense time and dispense force. These adjustments are made at a dispense station and are based on a calibration sample taken at the calibration station. The calibration step involves dispensing a sample of the loaded epoxy compound in the dispense syringe, and recording data on the memory device pertaining to the number of shots dispensed to produce the sample, the time taken for each shot and the total weight of the sample. At a dispensing station, a process controller reads the recorded data on the memory device and determines the count-down status of the worklife time, prior to dispensing any epoxy compound. On the basis of the data, the adjusted dispense time and dispense force parameters for dispensing a particular bead weight of the epoxy compound are determined in accordance with the ongoing change in viscosity of the curing epoxy resin compound.

15 Claims, 8 Drawing Sheets

PRECISION 2-PART EPOXY DISPENSING APPARATUS AND METHOD

TECHNICAL FIELD

The present invention relates to liquid dispensing apparatus and methods. More particularly, the present invention relates to liquid dispensing apparatus and methods for dispensing high viscosity liquids. Even more particularly, the present invention relates to liquid dispensing apparatus and methods for dispensing epoxy resins compounds having variable viscosity characteristics.

BACKGROUND ART

Epoxy resin, also commonly referred to as epoxy, is a thermosetting resin made by polymerization of an epoxide and has excellent bonding characteristics for use in the manufacture of disc-drive spindle motors. In particular, non-outgassing 2-part epoxies provide an excellent bond for establishing bearing pre-load bonds on these disc-drive spindle motors. In this particular application, the 2-part epoxy joints formed are small bond beads having weights on the order of 1–20 mg. Because the small 2-part epoxy beads cannot be mixed/dispensed at the same time, the epoxy resin compound must be pre-mixed, and made ready to use to ensure that the proper mix of the epoxy components comprising the epoxy resin compound is uniform during the dispense process. A dispense syringe is a commonly used tool for dispensing liquid adhesives. However, since the 2-part epoxy begins to cure at a fast rate, a dispense syringe used for dispensing non-fast curing adhesives is not a practical tool to employ for dispensing 2-part epoxies since the pre-mixed epoxy would begin to cure in the dispense syringe.

A known dispense system is called an air-over system wherein air under pressure is applied for a period of time to a syringe containing an adhesive. These types of dispense systems develop problems whenever the viscosity of the adhesives are changing. The presently known air-over dispense systems attempt to solve the dispense problem due to viscosity changes by controlling the environment to minimize the viscosity change. Since the viscosity change of the 2-part epoxy resin is due to inherent chemical curing characteristics, rather than environmental factors, the environmental control is not a viable solution for dispensing the 2-part epoxies.

A known dispense system which supposedly functions independent of adhesive viscosity is termed a positive displacement pump. In the positive displacement pump systems a piston is moved through a chamber filled with adhesive. The chamber is maintained in a full state by low-pressure air while the dispense volumes of the adhesive is controlled by the stroke length of the piston. The positive displacement pump technology does not appear to solve the problem where the liquid being dispensed is a 2-part epoxy that is curing and undergoing a change in viscosity.

Thus, a need is seen to exist for a dispensing system for forming bond beads from 2-part epoxies, in particular bond beads having weights on the order of 1–20 mg, that compensate for material viscosity increase over time due to inherent curing characteristics of the epoxy materials being used.

It is therefore a primary object of the present invention to provide a dispensing system for forming bond beads from 2-part epoxies, in particular bond beads having weights on the order of 1–20 mg, that compensate for material viscosity increase over time due to inherent curing characteristics of the epoxy materials being used.

DISCLOSURE OF INVENTION

Accordingly, the foregoing objects are accomplished by providing a liquid dispense system for dispensing a 2-part epoxy resin compound to form bond beads having weights on the order of 1–20 mg. The dispensing system comprises an epoxy resin compound pre-mixing and loading station, herein referred to as a first station means, an epoxy dispense time and dispense force calibration station, herein referred to as a second station means, and a plurality of epoxy dispensing third station means. At the-pre-mixing station, critical time data is recorded on an on-board semiconductor memory device which is mounted on the dispense syringe structure. Every dispense syringe structure is preferably portable and is provided with the memory device which electronically interfaces with an electronic process controller that is an integral part of each of the stations where the syringe structure is temporarily stationed during the process. By example, the semiconductor memory device is commercially available as a product bearing a name of Touch Memory (DS1992, DS1993 and DS1994) from Dallas Semiconductor Corporation, while the process controller is commercially available as a product bearing the trademark Little Star from Zworld, Davis, Calif. 95616. The critical time data pertains to the initial mix time of the 2-part epoxy compound and to the acceptable worklife time interval which the manufacturer of the epoxy resins considers that the associated mixed epoxy compound can be qualitatively dispensed. Since the viscosity of the mixed epoxy compound is changing over time, any dispensing of the epoxy compound that is required to be the same amount, but at different times, requires adjustments to dispense time and dispense force. These adjustment need to be made, and be based on a calibration sample taken of the particular epoxy compounds loaded in the syringe. At the calibration station, an epoxy compound aging inquiry is initially conducted on the particular epoxy compound that has been loaded in the dispense syringe prior to proceeding with the calibration step. The calibration step involves dispensing of a sample of the loaded epoxy compound in the dispense syringe, and recording data on the memory device pertaining to the number of shots dispensed to produce the sample, the time taken for each shot and the total weight of the sample. The fact that the dispense-end of the dispense syringe had been purged of old epoxy material prior to calibration and the fact that it has been calibrated is also recorded on the memory device. The loaded syringe structure, including the semiconductor memory device with the dispense information is in a ready state for dispensing the epoxy compound at any of the epoxy dispensing stations. At a dispensing station, a process controller reads the recorded original mixing time, the worklife time interval, calibration sample data, and the count-down status of the worklife time interval, prior to dispensing any epoxy compound. The dispense station will not dispense an epoxy bond bead onto a workpiece unless the adjusted parameters relating to the dispense time and dispense force for dispensing the particular bead weight have been calculated based on a calibration sample that is still within a worklife time interval which is considered suitable for making accurate dispense time and dispense force adjustments that are required due to the ongoing change in viscosity of the curing epoxy resin compound.

Other features of the present invention are disclosed or apparent in the section entitled: "BEST MODE FOR CARRYING OUT THE INVENTION."

BRIEF DESCRIPTION OF DRAWINGS

For fuller understanding of the present invention, reference is made to the accompanying drawing in the following detailed description of the Best Mode of Carrying Out the Present Invention. In the drawings.

Figure 1:
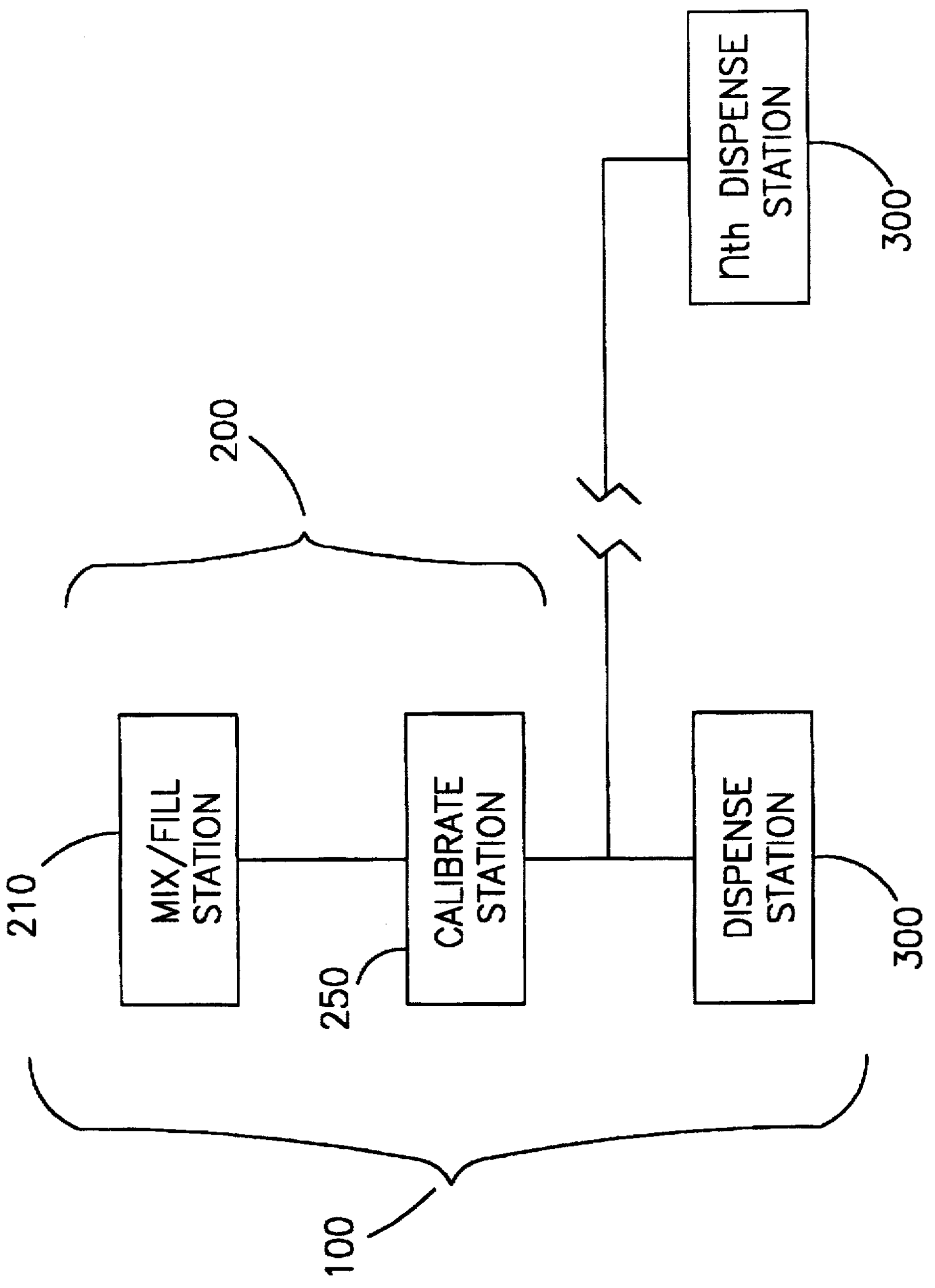
FIG. 1 is a block diagram representation of an epoxy compound dispensing system, including a first and second station means for mixing, loading and dispense calibrating the epoxy compound, and a plurality of third station means for dispensing the epoxy compound in accordance with a set of dispense parameters that compensate for the changing viscosity of the epoxy resin compound, in accordance with the present invention.

Reference numbers refer to the same or equivalent parts of the present invention throughout the several figures of the drawing.

BEST MODE FOR CARRYING OUT THE INVENTION

Referring now to FIG. 1 showing a block diagram representation of an epoxy compound dispensing system 100 in accordance with the present invention. As depicted, a first and second station means, 210 and 250, respectively, are combined in one structure 200 for performing the process functions of mixing, loading and dispense calibrating the epoxy compound. System 100 includes a plurality of third station means 300 which are used for dispensing the epoxy compound in accordance with a set of dispense parameters that compensate for the changing viscosity of the epoxy resin compound. Before proceeding with the description of the invention, it is important to keep in mind that an epoxy compound is chemically produced from chemical substances, typically comprising 2(two)-part epoxy resins. By example, 3M DP-460, an epoxy adhesive manufactured by Adhesive Systems, 3M Industrial Tape and Specialties Division, St. Paul Minn. 55144-1000, is provided in a-duo-pak arrangement containing two epoxy resins. Typically, information such as the worklife time is provided by the manufacturer of the epoxy adhesive as an indication of the time interval during which the epoxy compound produced from the 2-part epoxy resins must be dispensed to assure a reliable adhesive system. By example, the 3M DP-460 epoxy adhesive product has a 60 minute worklife specification. In accordance with the present invention, this particular worklife time interval information is useful in establishing boundaries during which specific values of time dependent pressures for dispensing the epoxy are useful. The pressures are determined using and implementing the exponential pressure equation for liquids, namely $P=Ae^{(kt+C)}$, where P is in pounds per square inch (psi), A is a constant representing the minimal pressure (psi) at time $t=0$, k is a rate constant relating to the viscosity of a liquid and C is a process dependant offset pressure parameter. For example, the 3M DP-460 epoxy adhesive has the constant $A=14.39$, the constant $k=0.206$ and the offset pressure parameter $C=0$. In accordance with the present invention, it has been found that in dispensing a constant small weight amount of the epoxy compound-(1–20 mg), the impact of the viscosity change over time on dispense rate (mg/sec) results in having to make adjustments of the dispense force and the duration of applying the force on the syringe, which force in the present invention is air pressure. As can be appreciated from analyzing the above pressure equation, for an increasing viscosity change, the air pressure change increases exponentially. In the field of dispensing epoxies, the need to dispense at pressures which are in the horizontal region of the pressure curve is important from an implementation standpoint, and more importantly to assure that the epoxy is not in the cured state. Accordingly, the present invention teaches dispensing mixed epoxy resin compounds in amounts in the range of 1–20 mg during the worklife of the mixed epoxy resin compound. As will be further described below, the mixed epoxy resin compound is calibrated by measuring the dispense rate (mg/sec.), at some time after being mixed and before the expiration of the worklife of the epoxy compound, and controlling the dispense weight using a timed dispense process. The epoxy is dispensed using regulated air pressure that increases over time to account for viscosity increases of the epoxy compound, while also considering the calibration data.

Figure 2:
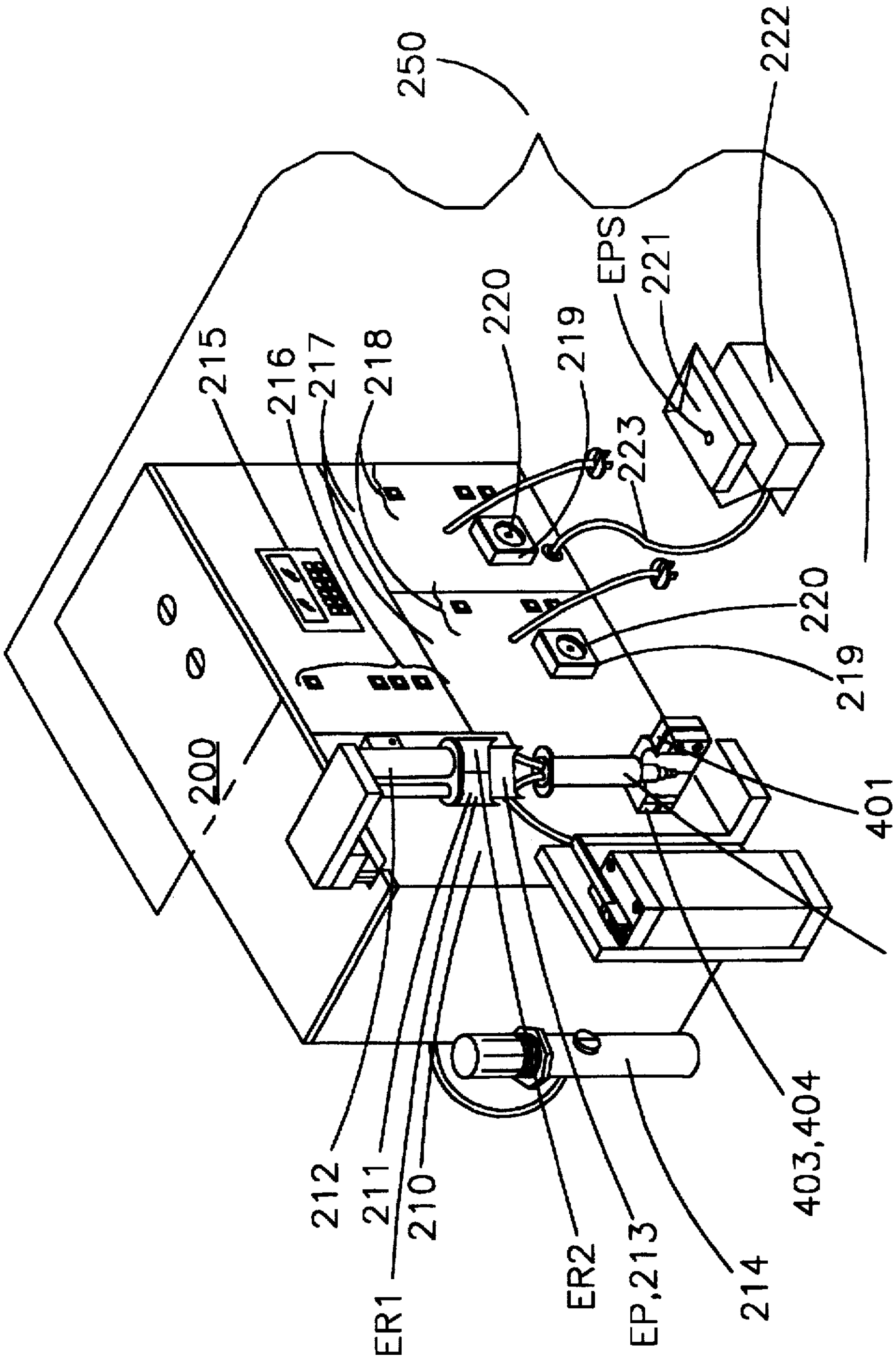
FIG. 2 is a perspective view of a combined embodiment of a first station and second station means illustrating a dispenser syringe and an accompanying memory device in accordance with the present invention, being loaded from a mixed batch of an epoxy compound at the first station, and also illustrating an-electrical-mechanical interface and stationing means at the second station in a ready state for calibrating the loaded epoxy compound.
Figure 4:
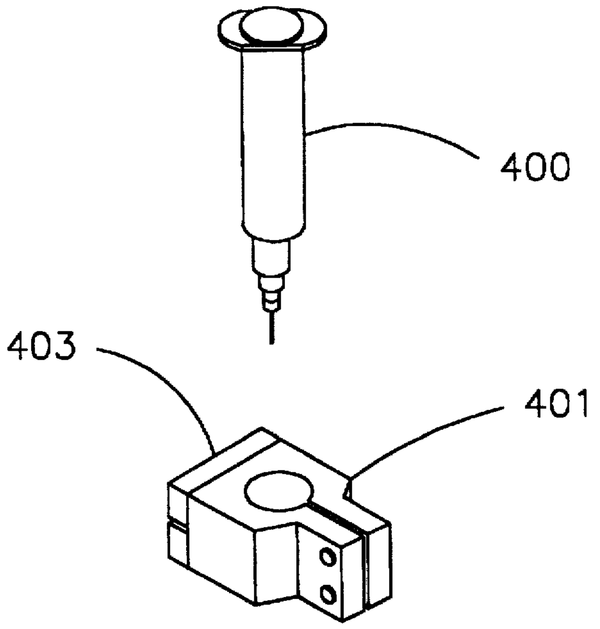
FIG. 4 is a perspective view of the portable liquid compound dispenser arrangement showing the syringe member, referred to herein as a container and dispenser member, and a mechanical carriage structure.
Figure 5:
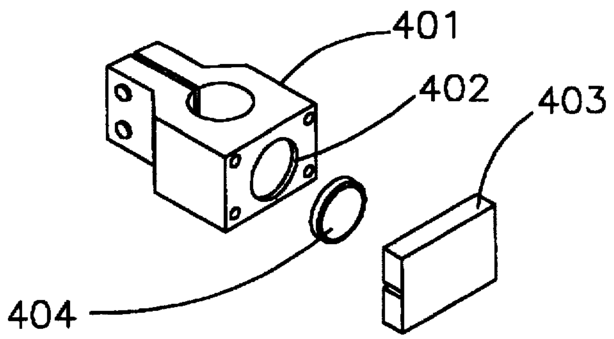
FIG. 5 is a perspective view of the mechanical carriage structure showing a manner of mounting a semiconductor memory device that is utilized to store dispense data about epoxy compound loaded in the syringe member illustrated in FIG. 4.

By example, FIG. 2 shows a combined embodiment 200 of first station means 210 and second station means 250. First station means 210 is shown manipulating a dispense syringe 400 and an accompanying memory device 404 mounted on a mechanical carriage 401, collectively referred to herein as a portable liquid compound dispenser arrangement. FIGS. 4 and 5 show the portable liquid compound dispenser arrangement comprising syringe member 400, referred to also as a container and dispenser member, a mechanical carriage structure 401, a mechanical mount 402, a semiconductor memory device 404 and memory device cap 403. Referring back to FIG. 2, dispense syringe 400 is shown being loaded from a baffle mixing tube 213 that has received a mixed batch of an epoxy compound from a duo-pak 211 containing the 2-part epoxy resins. By example, duo-pak 211 is commercially available as 3M DP-460 epoxy adhesive, as previously described. Duo-pak 211 is positioned for being driven by a double-piston air-pressure drive 212 which forces the epoxy resins ER1,ER2 from the duo-pak 211 into baffle mixing tube 213 for loading dispense syringe member 400 with the mixed epoxy resin compound EP. Air pressure is provided from a nearby air source container 214. During the stationing of the portable liquid compound dispenser arrangement (400,401,403,404) at the first station 210, data is entered into memory device 404 via an electronic process controller generally indicated as numeral 215. The data entered into memory device 404 pertains to the initial mix time of the 2-part epoxy compound EP and to the acceptable worklife time interval which the manufacturer of the epoxy resins considers that the associated mixed epoxy compound can be qualitatively dispensed. The mixing and filling operations at station 210 are controlled by manipulation of controls 216. Since the viscosity of the mixed epoxy compound EP is changing over time, any dispensing of the epoxy compound EP that is required to be in the same amount, but at different times, requires adjustments to dispense time and dispense force. These adjustments are made, and are based on a calibration sample taken of epoxy compound EP loaded in syringe 400 at first station 210. Although not shown in FIG. 2, the portable liquid compound dispenser arrangement (400,401,403, 404) would be stationed at one of the calibration ports 217 for being manipulated to collect and calibrate a sample of the loaded epoxy compound EP.

Calibration ports 217 each include a mechanical interface block 219 and data signal connection 220 for engaging memory device 404 to facilitate retrieving and recording data pertaining to the epoxy calibration sample. To this end, an epoxy compound aging inquiry is initially conducted on epoxy compound EP that has been loaded in dispense syringe 400 prior to proceeding with the calibration step. The calibration step involves dispensing an epoxy sample EPS from of the loaded epoxy compound EP in dispense syringe 400. The sample EPS is collected on a tray member 221 of a precision scale instrument 222. Weight sample information is communicated to process controller 215 via communication link 223. The process further includes recording data on memory device 404 pertaining to the number of shots dispensed to produce the sample EPS, the time taken for each shot and the total weight of the sample EPS. The fact that the dispense-end of dispense syringe 400 had been purged of air and old epoxy material prior to calibration and the fact that epoxy compound EP has been calibrated is also recorded on memory device 404. The loaded syringe structure (400,401,403, 404), including semiconductor memory device 404 with the calibration information is in a ready state for dispensing epoxy compound EP at any of the epoxy dispensing stations 300.

Figure 3:
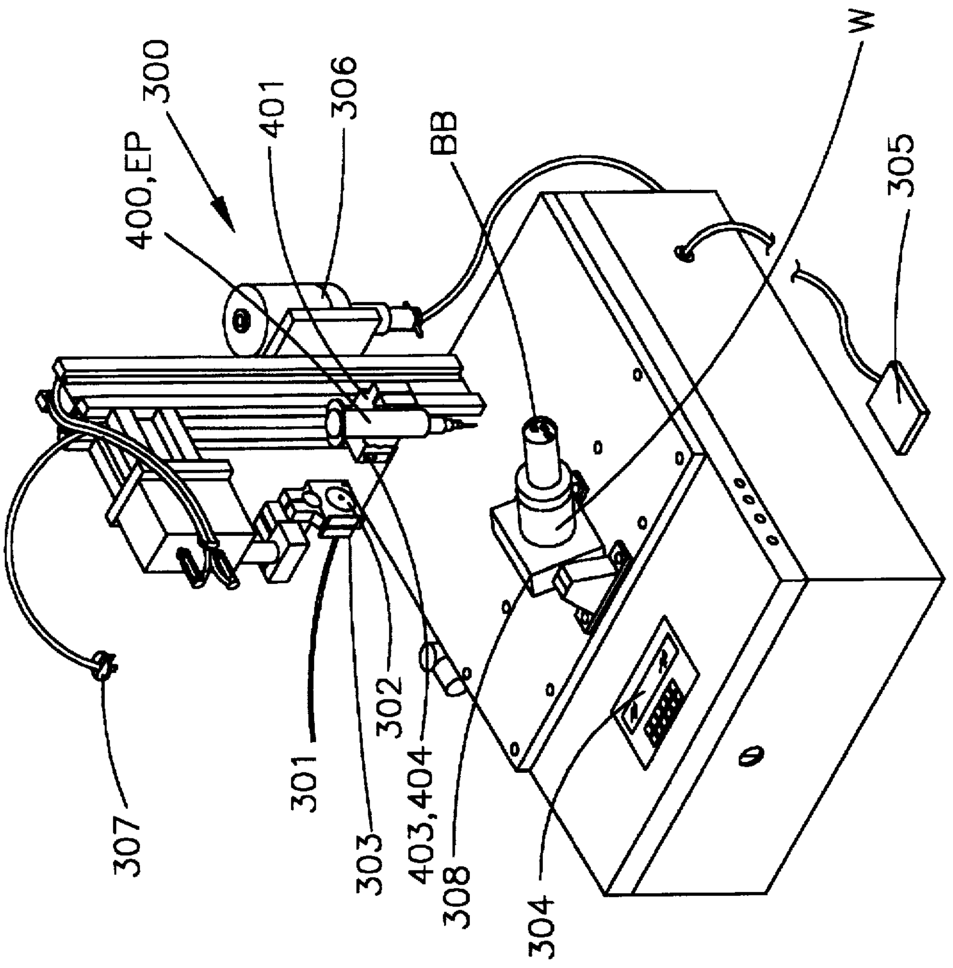
FIG. 3 is a perspective view of an embodiment of a third station illustrating an electrical-mechanical interface for accessing a memory device on a portable dispense syringe arrangement to facilitate dispensing a loaded epoxy compound onto a workpiece utilizing the depicted workpiece manipulation structure, in accordance with the present invention.

FIG. 3 shows an epoxy dispensing station 300, referred to herein as a third station. Once a loaded syringe structure (400,401,403, 404) is calibrated, the arrangement is stationed at an electrical-mechanical interface 301. Interface 301 comprises a mechanical mount 303 and a data signal connection 302 for engaging memory device 404. While stationed at dispensing station 300, process controller 304 reads the recorded original mixing time, the worklife time interval, all of the calibration sample data, and determines the count-down status of the worklife time interval, prior to dispensing any epoxy compound EP. Dispense station 300 includes a workpiece manipulation member 308 for manipulating a workpiece W, such as a disc-drive spindle motor. Once the process controller has determined that the epoxy compound EP in dispense syringe 400 is suitable for dispensing, an operator manipulates control 305 to effect dispensing an epoxy bond bead BB onto the workpiece W. As discussed previously, the process controller 304 will not dispense epoxy bond bead BB onto a workpiece W unless the adjusted parameters relating to the dispense time and dispense force for dispensing a particular bead weight have been calculated based on a calibration sample that is still within a worklife time specified by the epoxy adhesive manufacturer. The dispense time and dispense force adjustments compensate for the ongoing change in viscosity of the curing epoxy resin compound EP. Syringe 400 is positioned over workpiece at time of dispensing a bond bead BB, while air pressure is provided from air source 307 and regulated by programmable pressure regulator 306. The process controller determines new dispense parameters (time) for each bond bead deposited on the workpiece W.

Figure 6:
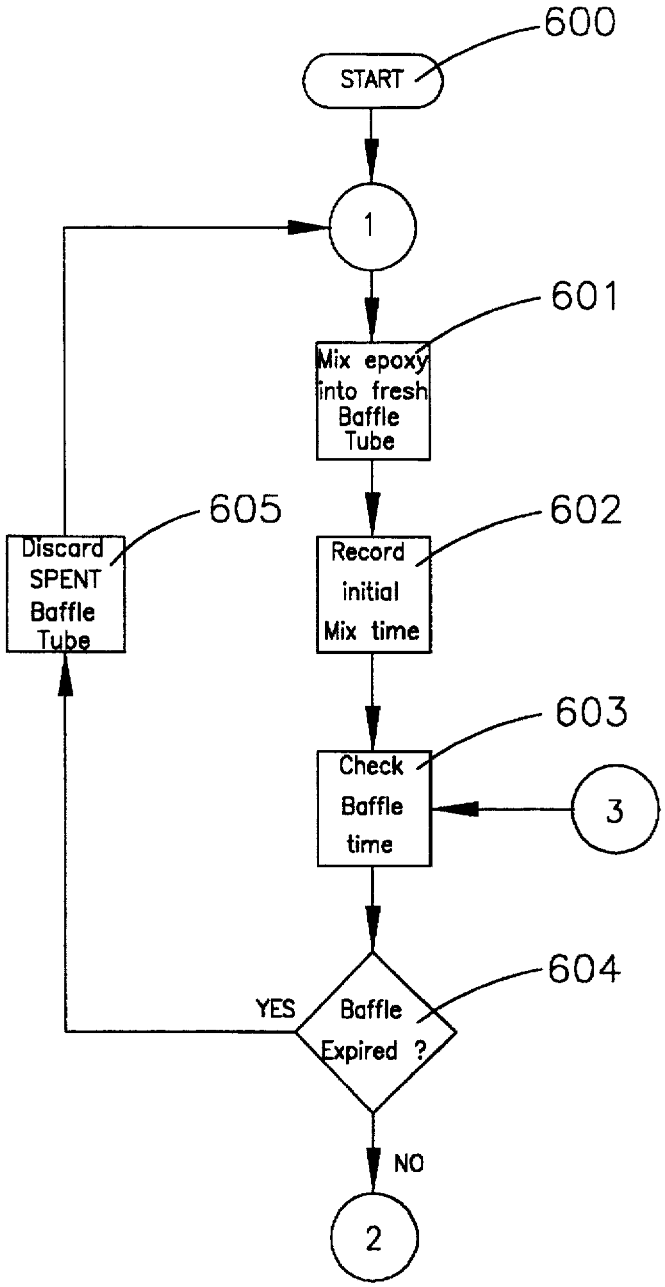
FIGS. 6 and 7, collectively, illustrate a flow diagram of the process steps taken at the first station means for mixing and loading an epoxy compound in preparation for dispense calibrating at the second station means.
Figure 7:
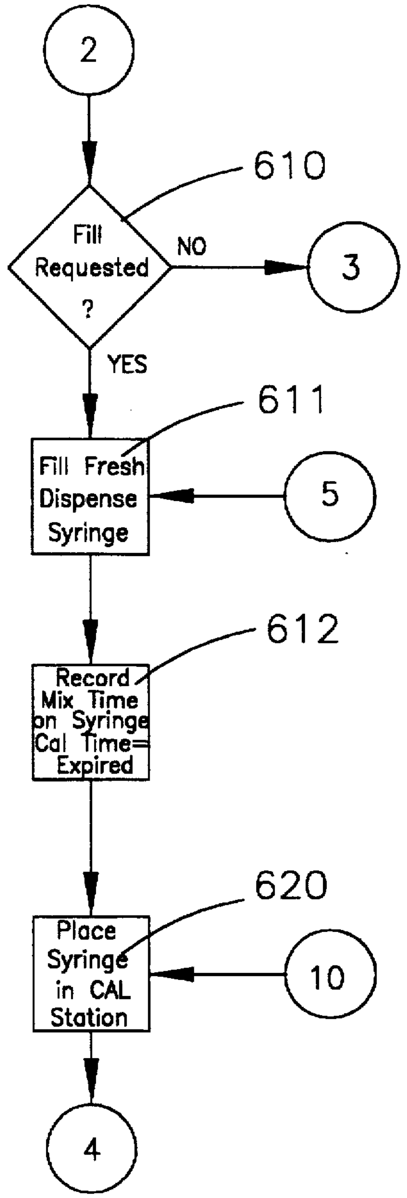
Figure 8:
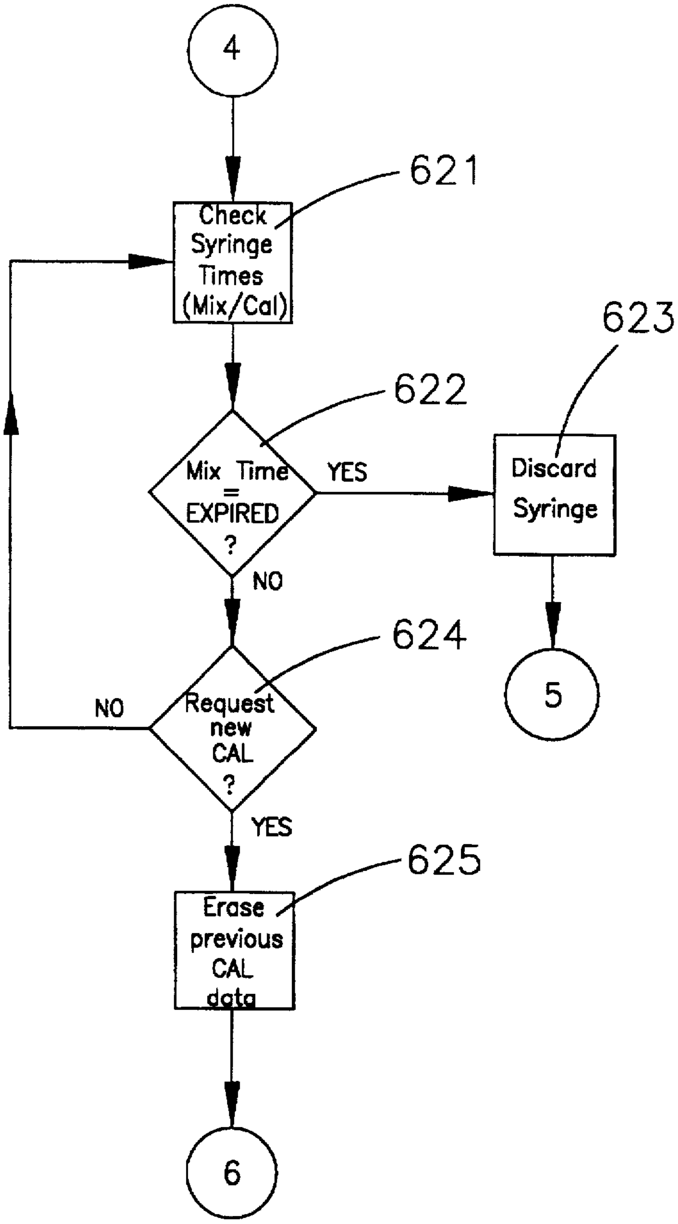
FIGS. 8, 9, 10 and 11, collectively, illustrate a flow diagram of the process steps taken at a second station means for collecting a sample of a syringe loaded epoxy compound and calibrating and storing critical dispense data in a semiconductor device about the sample for use in compensating subsequent dispense time and force used to dispense an amount of epoxy compound onto a workpiece.
Figure 9:
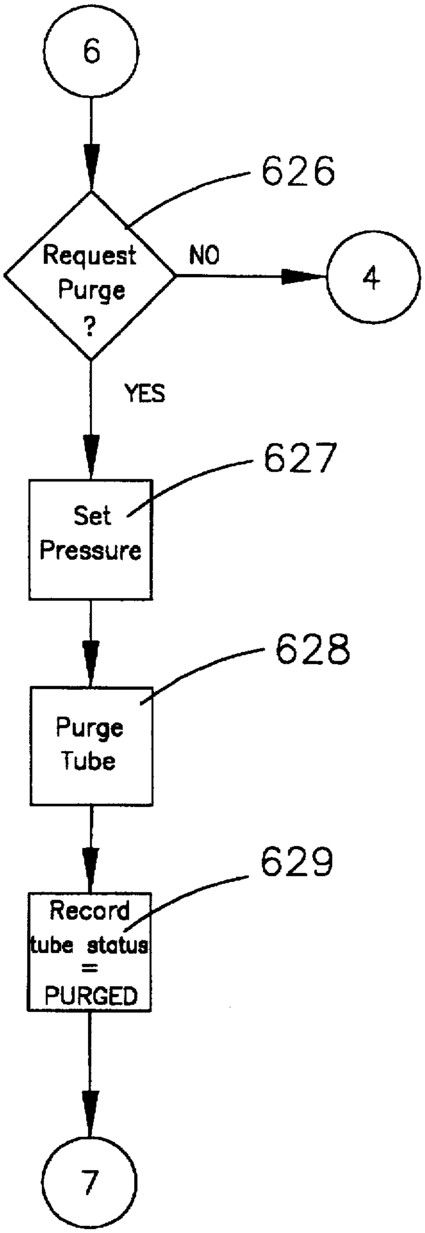
Figure 10:
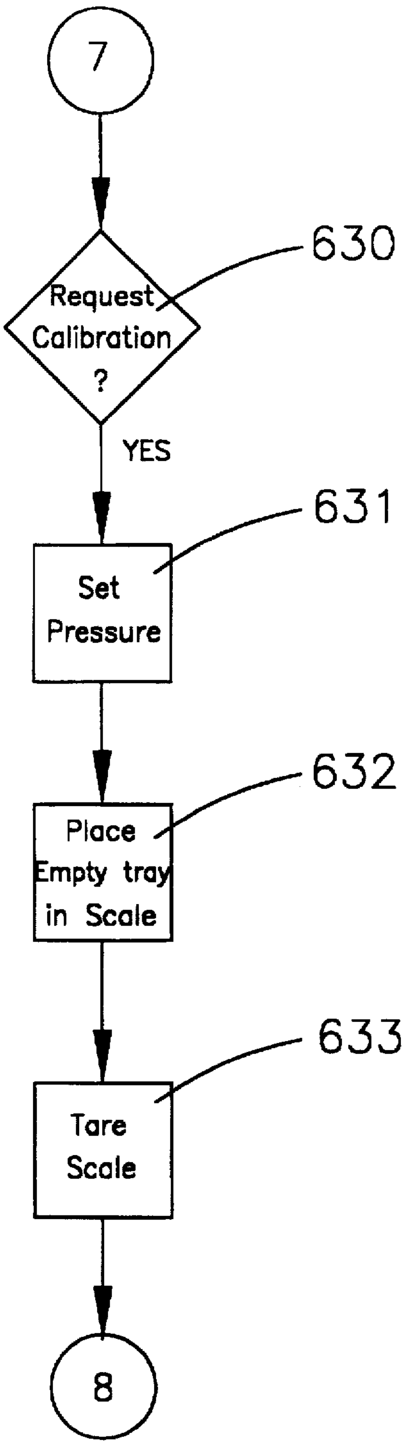
Figure 11:
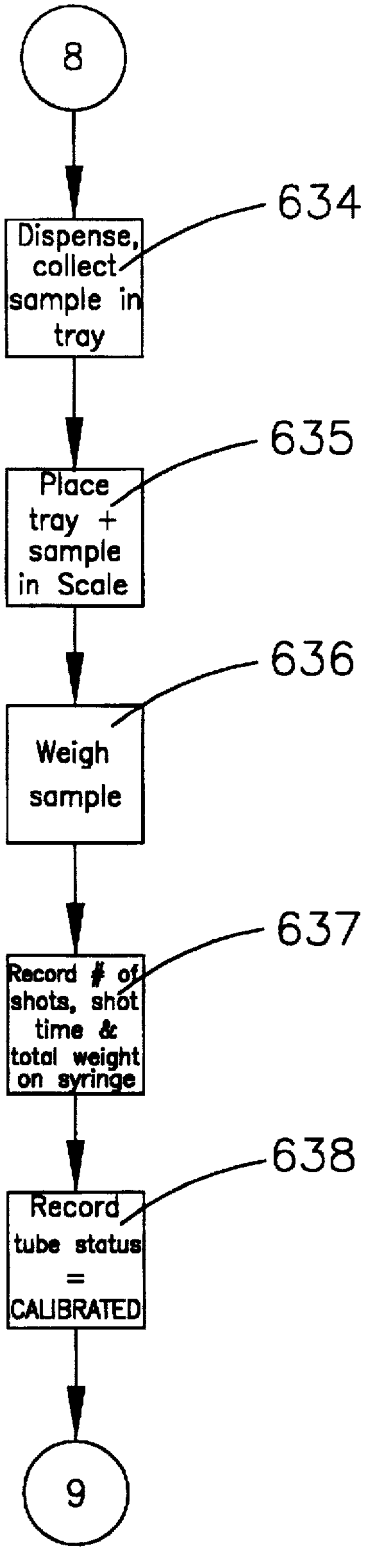

FIGS. 6 and 7, collectively, illustrate a flow diagram of the process steps taken at the first station means for mixing and loading an epoxy compound in preparation for dispense calibrating at the second station means. By example, the process begins at step 600 after having selected the epoxy adhesive to be used in the process, such as by choosing a duo-pak 211, commercially available as 3M DP-460 epoxy adhesive, as previously described. The provided epoxy resin substances, 2-part epoxy resins ER1, ER2, are mixed at step 601 by action of air-pressure drive piston member 212. Processor 215 and memory device 404 interact to effect step 602 to record the initial mix time, effect steps 603, 604, 610 relating to suitability of using epoxy material in baffle 213 and determining whether to fill syringe 400. Step 611 results in filling syringe 400 with the fast curing, viscosity increasing epoxy compound EP. Processor 215 and memory device 404 further interact to effect step 612 to record the mix time and the epoxy worklife time, also termed CAL time. The loaded syringe 400 and the dedicated memory device 404 mounted on mechanical carriage 401 are in a ready state for calibrating the loaded epoxy compound EP. FIGS. 8, 9, 10 and 11, collectively, illustrate a flow diagram of the process steps taken at a second station means 250 for collecting a sample EPS of a syringe loaded epoxy compound EP and calibrating and storing critical dispense data in semiconductor device 404 about sample EPS for use in compensating subsequent dispense time and force parameters used to dispense an amount of epoxy compound BB onto a workpiece W. The calibration process begins at- step 620 by placing the portable liquid compound dispenser arrangement (400,401,403,404) at one of the calibration ports 217. After being stationed, processor 215 and memory device 404 interact to effect step 621 to check the mix and CAL times, effect step 622 to either discard syringe step 623, or request new calibration step 624. The old calibration data is erased at step 625 prior to initiating purging step 626. Purging step 626 comprises setting the air pressure at step 627 and purging the dispense-end of dispense syringe 400 of air and any old epoxy material, step 628. After purging step 628, processor 215 and memory device 404 again interact to effect step 629 to record the syringe status as having been purged. The calibration process continues as indicated at step 630. The process involves collection of an epoxy sample EPS and use of a tray member 221 of a precision scale instrument 222. The pressure is set as indicated at step 631, then tray 221 is placed on scale to effect steps 632 and 633. Epoxy sample EPS is dispensed and placed on tray 221 as indicated at step 634. The dispensed sample and tray are then placed on scale 222 to effect steps 635 and 636 to weigh the sample. Weight sample information is communicated to process controller 215 via communication link 223. The process further includes step 637 for recording data on memory device 404 pertaining to the number of shots dispensed to produce the sample EPS, the time taken for each shot and the total weight of the sample EPS, and further, as indicated at step 638, the status of the loaded syringe 400 as being calibrated is also recorded. The loaded syringe 400 and the dedicated memory device 404 mounted on mechanical carriage 401 are in a ready state for dispensing the loaded epoxy compound EP.

Figure 12:
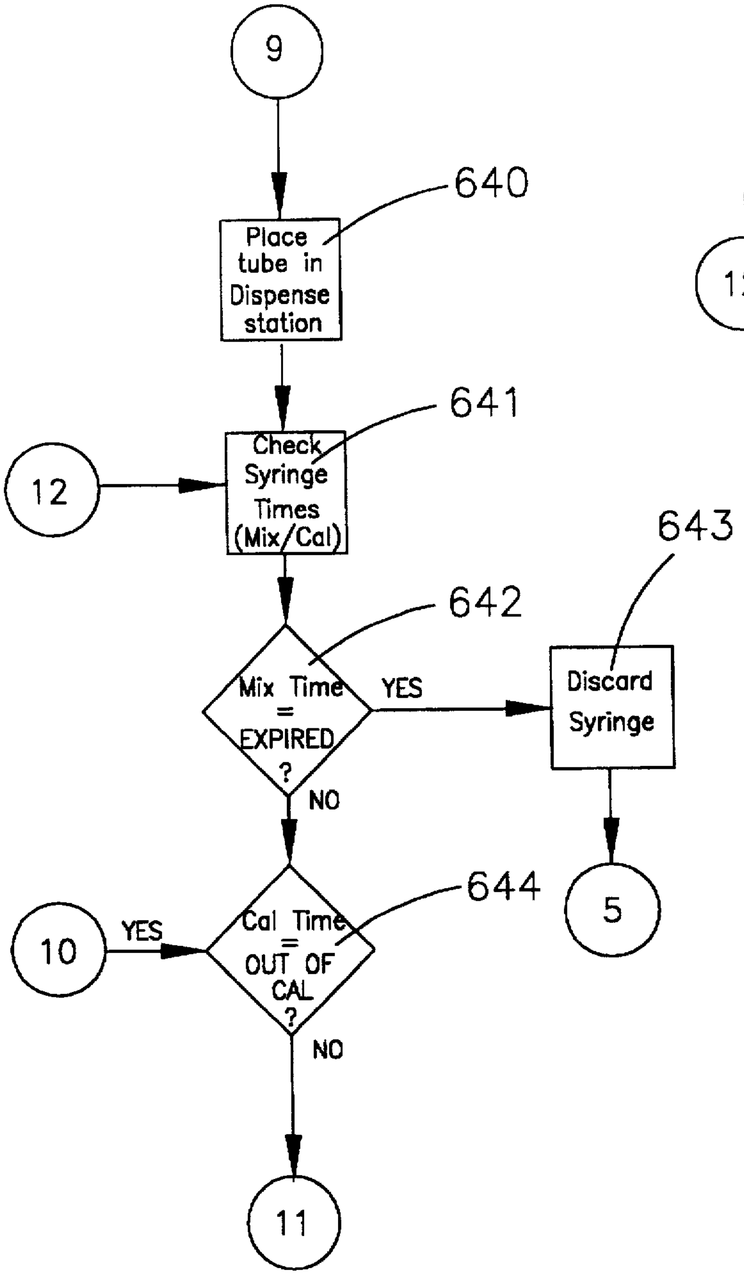
FIGS. 12 and 13, collectively, illustrate a flow diagram of the process steps taken at a third station means for dispensing a syringe loaded epoxy compound after verifying dispense suitability of the epoxy compound and determining dispense time and force parameters that compensate for changes in the viscosity of the epoxy compound and which are determined based on stored dispense data in a semiconductor memory accompanying the syringe loaded epoxy compound.
Figure 13:
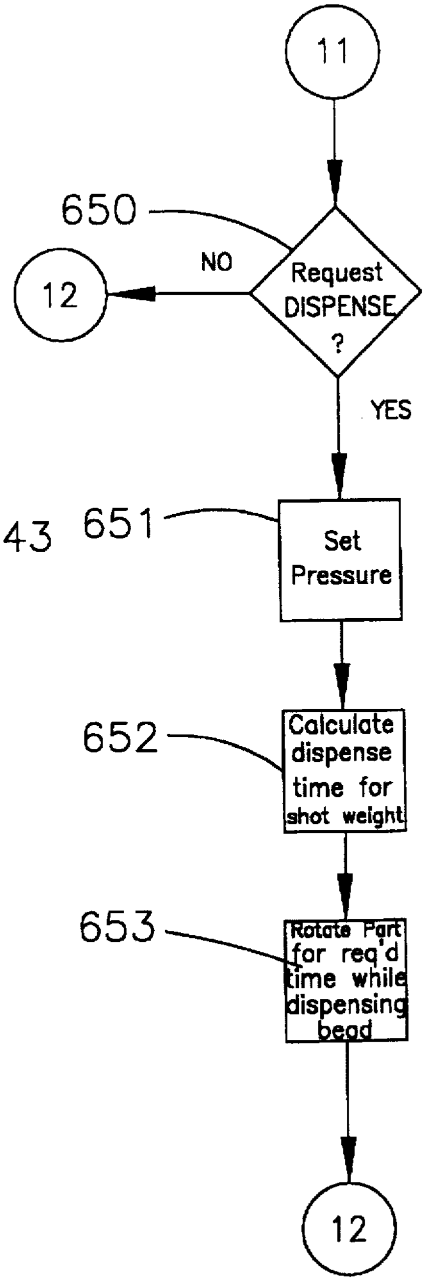

FIGS. 12 and 13, collectively, illustrate a flow diagram of the process steps taken at a third station means 300 for dispensing a syringe loaded epoxy compound EP after verifying dispense suitability of the epoxy compound, and determining dispense time and force parameters that compensate for changes in the viscosity of the epoxy compound EP and which are determined based on stored dispense data in semiconductor memory 404 accompanying the syringe loaded epoxy compound EP. After stationing step 640, processor 304 and memory device 404 interact to effect step 641 to determine whether the mix time, step 642, and worklife/CAL time, step 644, have expired. If the mix time has expired the syringe is discarded as indicated at step 643 and returned for being refilled at step 611. Otherwise, further inquiry is made at step 644 as to the worklife/CAL time of the loaded epoxy EP. If the CAL time is expired recalibration is required at step 620, otherwise, dispensing step 650 is initiated. Dispensing step 650 is effected by setting the air dispense pressure at step 651. Controller 304 then effects step 652 and calculates the dispense time for the particular shot weight that needs to be dispensed. The dispensing step 653 is then effected to properly dispense the epoxy onto the workpiece. After dispensing a bond bead amount of epoxy BB onto workpiece W, and if additional beads are need, the loaded syringe 400 is directed back to step 641 to again check dispense suitability before performing dispense step 652 again.

The present invention has been particularly shown and described with respect to certain preferred embodiments and features thereof. However, it should be readily apparent to those of ordinary skill in the art that various changes and modifications in form and detail may be made without departing from the spirit and scope of the inventions as set forth in the appended claims. The inventions illustratively disclosed herein may be practiced without any element which is not specifically disclosed herein.

We claim:

1. A method for dispensing a 2(two)-part epoxy resin compound onto a workpiece, said method comprising the steps of:

(a) providing a liquid dispensing system, said system comprising:

at least one portable liquid compound dispenser arrangement, said dispenser arrangement comprising a mechanical carriage, a container and dispenser member and a semiconductor memory device; a first station means for mixing and loading an amount of said 2-part epoxy resin compound into said container and dispenser member;

a second station means for calibrating a dispense time and a dispense force for said 2-part epoxy resin compound utilizing a sample from said 2-part epoxy resin compound loaded into said container and dispenser member; and a third station means for verifying dispense suitability of said 2-part epoxy resin compound that was sampled at said second station means and contained in said container and dispenser member, determining a set of dispense parameters that compensate for changing viscosity of said 2-part epoxy resin compound, and dispensing an amount of said 2-part epoxy resin compound onto a provided workpiece;

(b) providing chemical substances for producing a 2-part epoxy resin compound;

(c) mixing said chemical substances and producing a 2-part epoxy resin compound at said first station means;

(d) loading an amount of said produced 2-part epoxy resin compound into said container and dispenser member;

(e) electronically storing in said semiconductor memory device an initial mixing time and a worklife time of said loaded 2-part epoxy resin;

(f) calibrating, at said second station means, said loaded 2-part epoxy resin by establishing a set of calibrated dispense data from a sample of said loaded 2-part epoxy resin, said data including weight of said sample, number of shots forming said sample, and time taken per shot;

(g) further electronically storing said set of calibrated dispense data in said semiconductor memory device;

(h) determining, at said third station means, a set of dispense parameters for dispensing a pre-determined amount of said loaded-2-part epoxy resin onto a workpiece during said worklife time, said set of dispense parameters comprising dispense time and dispense force information compensated for viscosity changes that have occurred in said loaded 2-part epoxy resin since said initial mix time; and (i) dispensing said pre-determined amount of said loaded 2-part epoxy resin onto a workpiece.

2. A method for dispensing a 2(two)-part epoxy resin compound onto a workpiece as described in claim 1, wherein said step (a) of providing a liquid dispensing system, comprises:

providing said semiconductor memory device as a dedicated component of said portable dispenser arrangement such that said stored time and dispensing information as claimed in steps (e) and (g) follows and pertains to said loaded 2-part epoxy resin in said container and dispenser member.

3. A method for dispensing a 2(two)-part epoxy resin compound onto a workpiece as described in claim 1, wherein said step (h) is preceded by a step of determining suitability of dispensing said loaded 2-part epoxy resin by verifying that said worklife time has not expired.

4. A method for dispensing a 2(two)-part epoxy resin compound onto a workpiece as described in claim 1, wherein said step (h) comprises using exponential pressure equation $P=Ae^{(kx+C)}$ for determining a dispense air pressure for ramping and setting said dispense force at time of decision to dispense a bond bead onto a workpiece.

5. An electromechanical system for dispensing a liquid compound, said system having at least one electronic process controller, said system comprising:

a first station means for mixing and loading a liquid compound;

a second station means for calibrating a dispense time and dispense force of said liquid compound;

at least one third station means for dispensing said liquid compound; and at least one portable liquid compound dispenser arrangement, said dispenser arrangement comprising a mechanical carriage, a container and dispenser member and a semiconductor memory device, said portable dispenser arrangement being stationed and manipulated at each of said first, second and third station means during a liquid compound preparation and dispensing process, said semiconductor memory device being manipulated to effect storage of dispense related data about said liquid compound, said data facilitating said at least one electronic process controller to determine suitability of dispensing said liquid compound and to determine an appropriate set of dispense parameters at time of dispensing said liquid compound.

6. An electromechanical system for dispensing a liquid compound as described in claim 5, wherein:

said liquid compound comprises a 2(two)-part epoxy resin compound, said 2-part epoxy resin compound having time dependent curing characteristics that cause a change in a viscosity of said 2-part epoxy resin compound and that affect dispensing parameters of said 2-part epoxy resin compound; and said first station means comprises a mixing container member for receiving epoxy component substances for being mixed and producing said 2-part epoxy resin compound, a piston means operable to effect mixing said epoxy component substances in said mixing container member, an electrical-mechanical interface and stationing means for receiving, manipulating and electronically interfacing with said at least one portable liquid compound dispenser arrangement to effect filling said container and dispenser member with said 2-part epoxy resin compound and to also effect said storage of dispense related data about said liquid compound in said semiconductor memory device, said data comprising an initial time of mixing of said 2-part epoxy resin compound, and maximum allowable worklife time to dispense said 2-part epoxy resin compound in accordance with said time dependent curing characteristics.

7. An electromechanical system for dispensing a liquid compound as described in claim 6, wherein:

said second station means comprises a precision scale set-up, and an electrical-mechanical interface and stationing means for receiving, manipulating, and electronically interfacing with said at least one portable liquid compound dispenser arrangement, said arrangement having said container and dispenser member loaded with said 2-part epoxy resin compound, said second station means being operable to facilitate:

purging foreign material from a dispense-end of said container and dispenser member, dispensing a sample of said 2-part epoxy resin compound for establishing calibrated dispense data for said sample, establishing a calibrated status of said at least one portable liquid compound dispenser arrangement and storing said status in said semiconductor memory device, and storing of additional dispense related data about said 2-part epoxy resin compound in said semiconductor memory device, said additional data comprising weight of said sample, number of shots forming said sample, and time taken per shot.

8. An electromechanical system for dispensing a liquid compound as described in claim 7, wherein:

said third station means comprises:

(a) an electrical-mechanical interface and stationing means for receiving and electronically interfacing with said at least one portable liquid compound dispenser arrangement, said arrangement having said container and dispenser member containing said 2-part epoxy resin compound, said third station means being operable to facilitate accessing said semiconductor memory device and determining dispense suitability of said 2-part epoxy resin compound contained in said container and dispenser member based on said worklife time, and further accessing said semiconductor memory device and manipulating said stored dispense related data about said 2-part epoxy resin compound and determining a set of dispense parameters that compensate for changing viscosity of said 2-part epoxy resin compound;

(b) a dispensing mechanism in mechanical contact with said container and dispenser member containing said 2-part epoxy resin compound, said dispensing mechanism being responsive to said set of dispense parameters to dispense an amount of said 2-part epoxy resin compound onto a provided workpiece; and (c) a workpiece manipulation mechanism.

9. An electromechanical system for dispensing a 2(two)-part epoxy resin compound, said 2-part epoxy resin compound having time dependent curing characteristics that cause a change in a viscosity of said 2-part epoxy resin compound and that affect dispensing parameters of said 2-part epoxy resin compound, said system having at least one electronic process controller, said system comprising:

at least one portable liquid compound dispenser arrangement, said dispenser arrangement comprising a mechanical carriage, a container and dispenser member and a semiconductor memory device; a first station means for pre-mixing and loading an amount of said 2(two)-part epoxy resin compound, said first station means comprising a mixing container member for receiving epoxy component substances for being mixed and producing said 2-part epoxy resin compound, a piston means operable to effect mixing said epoxy component substances in said mixing container member, an electrical-mechanical interface and stationing means for receiving, manipulating and electronically interfacing with said at least one portable liquid compound dispenser arrangement to effect filling said container and dispenser member with said 2-part epoxy resin compound;

a second station means for calibrating a dispense time and dispense force of said 2-part epoxy resin compound; and at least one third station means for dispensing said liquid compound, said portable dispenser arrangement being stationed and manipulated at each of said first, second and third station means at different stages of a preparation and dispensing process of said 2(two)-part epoxy resin compound, said semiconductor memory device being manipulated to effect storage of dispense related data about said 2(two)-part epoxy resin compound, said data facilitating said at least one electronic process controller to determine a set of dispense parameters at time of dispensing said 2-part epoxy resin compound, said data comprising an initial time of mixing of said 2-part epoxy resin compound, and maximum allowable worklife time to dispense said 2-part epoxy resin compound in accordance with said time dependent curing characteristics.

10. An electromechanical system for dispensing a 2(two)-part epoxy resin compound as described in claim 9, wherein:

said second station means comprises a precision scale set-up, and an electrical-mechanical interface and stationing means for receiving, manipulating, and electronically interfacing with said at least one portable liquid compound dispenser arrangement, said arrangement having said container and dispenser member containing said 2-part epoxy resin compound, said second station means being operable to facilitate:

purging foreign material from a dispense-end of said container and dispenser member, dispensing a precision sample amount of said 2-part epoxy resin compound onto said precision scale set-up, establishing a calibrated status of said at least one portable liquid compound dispenser arrangement and storing said status in said semiconductor memory device, and storing of additional dispense related data about said 2-part epoxy resin compound in said semiconductor memory device, said additional data comprising weight of said sample, number of shots forming said sample, and time taken per shot.

11. An electromechanical system for dispensing a 2(two)-part epoxy resin compound as described in claim 10, wherein:

said third station means comprises:

(a) an electrical-mechanical interface and stationing means for receiving and electronically interfacing with said at least one portable liquid compound dispenser arrangement, said arrangement having said container and dispenser member containing said 2-part epoxy resin compound, said third station being operable to facilitate accessing said semiconductor memory device and determining dispense suitability of said 2-part epoxy resin compound contained in said container and dispenser member based on said worklife time, and further accessing said semiconductor memory device and manipulating said stored dispense related data about said 2-part epoxy resin compound and determining a set of dispense parameters that compensate for changing viscosity of said 2-part epoxy resin compound;

(b) a dispensing mechanism in mechanical contact with said container and dispenser member containing said 2-part epoxy resin compound, said dispensing mechanism being responsive to said set of dispense parameters to dispense an amount of said 2-part epoxy resin compound on a provided workpiece; and (c) a workpiece manipulation mechanism.

12. An electromechanical system for dispensing a 2(two)-part epoxy resin compound, said 2-part epoxy resin compound having time dependent curing characteristics, including a maximum allowable worklife time, that relate to a change in a viscosity of said 2-part epoxy resin compound and that affect dispensing parameters of said 2-part epoxy resin compound, said system having at least one electronic process controller, said system comprising:

at least one portable liquid compound dispenser arrangement, said dispenser arrangement comprising a mechanical carriage, a container and dispenser member and a semiconductor memory device; a first station means for mixing and loading an amount of said 2(two)-part epoxy resin compound into said container and dispenser member;

a second station means for calibrating a dispense time and a dispense force for said 2-part epoxy resin compound utilizing a sample from said 2-part epoxy resin compound loaded into said container and dispenser member; and a third station means for verifying dispense suitability of said 2-part epoxy resin compound that was sampled at said second station means and being contained in said container and dispenser member, determining a set of dispense parameters that compensate for changing viscosity of said 2-part epoxy resin compound, and dispensing an amount of said 2-part epoxy resin compound onto a provided workpiece.

13. Dispense apparatus for dispensing a viscous epoxy compound in accordance with a set of dispense parameters that compensate for a change in viscosity over time of said viscous epoxy compound, said dispense apparatus comprising:

a syringe, said syringe being acted upon by a piston and application of air 5 pressure thereto said piston in dispensing a constant small weight amount of said epoxy compound in the range of 1 to 20 mg, said change in viscosity, and the associated affects on dispense rate (mg/sec), resulting in having to make adjustments of a dispense force and a duration of applying said dispense force on said piston, said dispense force being provided by said air pressure;

a memory device associated with said syringe for carrying specific information concerning any compound disposed in said syringe within said memory device;

a first station means for mixing and loading said epoxy compound into said syringe, said first station means including an interface for coupling to said memory device to permit writing information concerning said epoxy compound loaded into said syringe;

a second station means for calibrating said epoxy compound and producing calibration data, said mixed epoxy resin compound being calibrated by measuring a dispense rate (mg/sec.) at some time after being mixed and before the expiration of a worklife time interval of said epoxy compound, said second station means including an interface for coupling to said memory device to permit writing information concerning calibration of said epoxy compound loaded into said syringe; and at least one third station means which is used for dispensing said epoxy compound, and controlling an actual dispense time using a timed dispense process, said at least one third station means including an interface for coupling to said memory device to permit reading information concerning said epoxy compound loaded into said syringe, said at least one third station means being provided with means for increasing said air pressure over time to compensate for viscosity increases of said epoxy compound while also taking into account said calibration data.

14. Dispense apparatus for dispensing a viscous epoxy compound in accordance with a set of dispense parameters that compensate for change in viscosity of said viscous epoxy compound, said epoxy compound being chemically produced from chemical substances provided in a dual pack arrangement containing two epoxy resins, information such as a worklife-time-interval being provided by a manufacturer of said epoxy compound as an indication of a time interval during which said epoxy compound must be dispensed to assure a reliable adhesive system, said worklife-time-interval information being useful in establishing boundaries during which specific values of time-dependent-pressures for dispensing said epoxy compound are useful, said dispense apparatus comprising:

a syringe, said syringe being acted upon by a piston and by the application of air pressure to said piston, said air pressure being determined using and implementing an exponential pressure equation for liquids, namely $P=Ae^{(kt+C)}$, where P is in pounds per square inch (psi), A is a constant representing the minimal pressure (psi) at time t=0, k is a rate constant relating to the viscosity of a liquid, and C is a process dependant offset pressure parameter, said syringe being used in dispensing a constant small weight amount of said epoxy compound in the range of 1 to 20 mg, said epoxy compound having a viscosity change over time, and an associated effect on dispense rate (mg/sec) that results in having to make adjustments of a dispense force and a duration of applying said dispense force on said piston, said dispense force being provided by said air pressure;

a memory device associated with said syringe for carrying specific information concerning any compound disposed therein;

a first station means for performing process functions of mixing and loading said epoxy compound into said syringe, said first station means including an interface for coupling to said memory device to permit writing information concerning said epoxy compound loaded into said syringe;

a second station means for performing process functions of calibrating said epoxy compound and producing calibration data, said mixed epoxy resin compound being calibrated by measuring the dispense rate (mg/sec.) at some time after being mixed and before the expiration of the worklife of said epoxy compound, said second station means including an interface for coupling to said memory device to permit writing information concerning calibration of said epoxy compound loaded into said syringe; and at least one third station means which is used for dispensing said epoxy compound, and controlling the dispense time using a timed dispense process, said at least one third station means including an interface for coupling to said memory device to permit reading information concerning said epoxy compound loaded into said syringe, said at least one third station means being provided with means for increasing said air pressure over time to compensate for viscosity increases of said epoxy compound while also taking into account said calibration data.

15. A method for dispensing a viscous epoxy compound in accordance with a set of dispense parameters that compensate for a change in viscosity of said viscous epoxy compound, said method comprising the following steps:

mixing and loading said epoxy compound into a syringe that is acted upon by a piston, said piston being urged by application of air pressure thereto to effect dispensing a constant small weight amount of said epoxy compound in the range of 1 to 20 mg, said change in viscosity, and the associated effects on dispense rate (mg/sec), resulting in having to make adjustments of a dispense force and a duration of applying said dispense force on said piston, said dispense force being provided by said air pressure;

writing information concerning said epoxy compound to a memory device associated with said syringe;

calibrating said epoxy compound and producing calibration data, said epoxy compound being calibrated by measuring a dispense rate (mg/sec.) at some time after being mixed and before the expiration of a worklife of said epoxy compound;

writing information concerning calibration of said epoxy compound to said memory device;

reading the information concerning said epoxy compound at a dispense station; and dispensing said epoxy compound, and controlling a dispense time using a timed dispense process, said dispense station increasing said air pressure over time to compensate for viscosity increases of said epoxy compound while also taking into account said calibration data.

* * * * *

UNITED STATES PATENT AND TRADEMARK OFFICE
CERTIFICATE OF CORRECTION

PATENT NO : 5,801,951

DATED : September 1, 1998

INVENTOR(S) : Burns, II, et al.

It is certified that error appears in the above-identified patent and that said Letters Patent is hereby corrected as shown below:

On the title page item [75], please delete the word "Sand" after Inventor Dean Albert Tarrant's name, and replace with --San--.

Signed and Sealed this

Fifth Day of January, 1999

Attest:

Attesting Officer

*Acting Commissioner of Patents and Trademarks*